United States Patent [19]

Promersberger

[11] Patent Number: 4,687,365
[45] Date of Patent: Aug. 18, 1987

[54] LOAD LIMITED SWIVEL CONNECTOR

[75] Inventor: Jon Promersberger, Mankato, Minn.

[73] Assignee: Condux International, Inc., Mankato, Minn.

[21] Appl. No.: 881,498

[22] Filed: Jul. 2, 1986

Related U.S. Application Data

[63] Continuation of Ser. No. 709,136, Mar. 7, 1985, abandoned.

[51] Int. Cl.⁴ ............... F16D 1/12; F16D 9/00; F16P 5/00
[52] U.S. Cl. .................... 403/2; 403/164; 403/165; 411/395; 411/916; 254/134.3 FT
[58] Field of Search ............ 403/2, 164, 165, 299, 403/343; 24/705, 115 F; 411/1-3, 5, 8, 395, 916; 254/134.3 FT, 134.3

[56] References Cited

U.S. PATENT DOCUMENTS

| 183,750 | 10/1876 | Clifford . | |
| 518,213 | 4/1894 | Ball . | |
| 1,113,256 | 10/1914 | Smith . | |
| 1,471,105 | 10/1923 | Cox | 403/164 |
| 1,698,162 | 1/1929 | Lynch | 403/164 |
| 1,786,081 | 12/1930 | Nourse . | |
| 2,032,764 | 3/1936 | Otte . | |
| 2,060,593 | 11/1936 | Schaurte et al. | 411/916 |
| 2,083,054 | 6/1937 | Cline | 411/916 |
| 2,105,178 | 1/1938 | Berndt . | |
| 2,246,588 | 6/1941 | Harrall | 403/165 |
| 2,651,533 | 9/1953 | Miller | 403/164 |
| 2,693,980 | 11/1954 | Heidman, Jr. . | |
| 2,889,162 | 6/1959 | Norris | 403/2 |
| 3,185,413 | 5/1965 | Walker | 403/2 X |
| 3,346,284 | 10/1967 | Petersen et al. | 403/165 |
| 3,836,268 | 9/1974 | Behnke . | |
| 3,922,104 | 11/1975 | McCullough | 403/2 |
| 4,017,198 | 4/1977 | Mason . | |
| 4,074,519 | 2/1978 | Garrett . | |
| 4,308,419 | 12/1981 | Fredriksson . | |
| 4,337,923 | 7/1982 | Smith | 403/285 |

FOREIGN PATENT DOCUMENTS 240655 5/1946 Fed. Rep. of Germany ...... 403/164

Primary Examiner—Andrew V. Kundrat
Assistant Examiner—Todd G. Williams
Attorney, Agent, or Firm—Burd, Bartz & Gutenkauf

[57] ABSTRACT

A swivel connector for connecting a first and second line for towing of one line by the other wherein there is provided an upper limit on loading that may be imposed between the lines as a safeguard to damage to one of the lines. The swivel connector includes first and second swivel heads connected by a load pin. The load pin is fixed to fracture at an approximate predetermined loading between the first and second swivel heads which loading is beneath that which would otherwise cause danger or damage to one of the lines. Upon fracture of the pin, it is readily replaced so that the swivel head can be used again.

16 Claims, 8 Drawing Figures

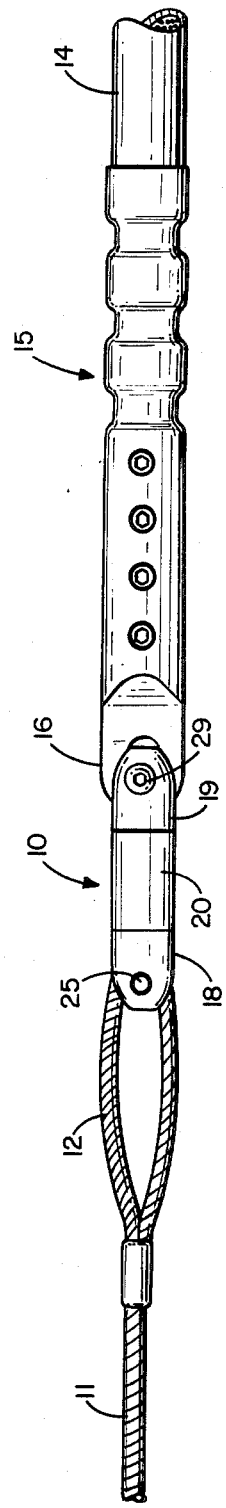
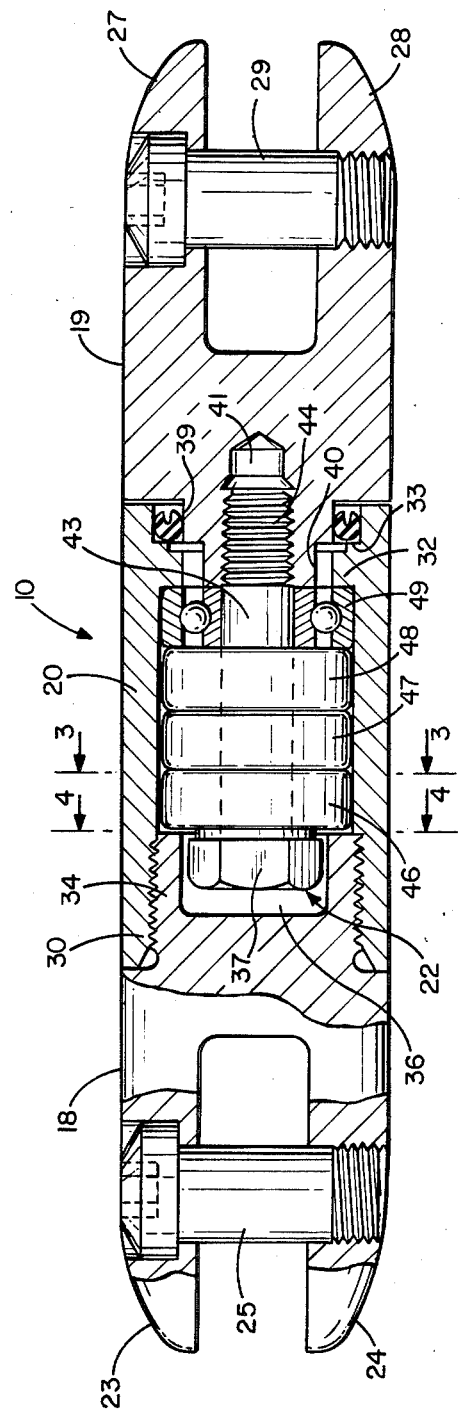
FIG. 1
FIG. 2

LOAD LIMITED SWIVEL CONNECTOR

This application is a continuation of U.S. application Ser. No. 709,136 filed Mar. 7, 1985, now abandoned.

BACKGROUND OF THE INVENTION

In certain line pulling or dragging operations wherein one line is used to pull or guide another line to a proper useable position, it is desirable that the load imposed on either the pulled or pulling line be limited for various reasons as to avoid damage. For example, wire rope is used to train fiber optic telephone cable through protective ducting positioned underground, overhead, in building walls or the like. Imposition of excessive stress on the fiber optic cable can result in damage. Excesive loading can be the result of dead load or abrupt acceleration. In other pulling or dragging applications, it is desirable to limit the permissible loading on the cable during the positioning operation.

SUMMARY OF THE INVENTION

According to the present invention, there is provided a load-limited swivel connector which fractures upon imposition of loading exceeding a limit. The load limit of the connector is less than the critical loading of the cable or the like to be pulled or towed such that fracture of the connector occurs as a safeguard before the critical load limit is reached.

The swivel connector of the invention includes first and second swivel heads, each being connectable to a line or cable-like structure for the pulling operation. One head is connected to an intermediate body portion. The other head is connected to a load limited fracture pin having a shank with a reduced cross sectional area at a vulnerable section calibrated to fracture upon reaching excessive, predetermined loading. The fracture upon reaching excessive, predetrmined loading. The fracture pin and the body portion are interconnected by a swivel assembly such that one head can swivel with respect to the other during the pulling operation. This greatly facilitates placement of the cable or line or the like.

IN THE DRAWING

FIG. 1 is an elevational view of a load limited swivel connector of the invention shown in operation to connect a wire rope and a telepone cable for proper placement of the cable;

FIG. 2 is an enlarged view of the swivel connector of FIG. 1 partially in section;

DESCRIPTION OF PREFERRED EMBODIMENTS

Figure 3:
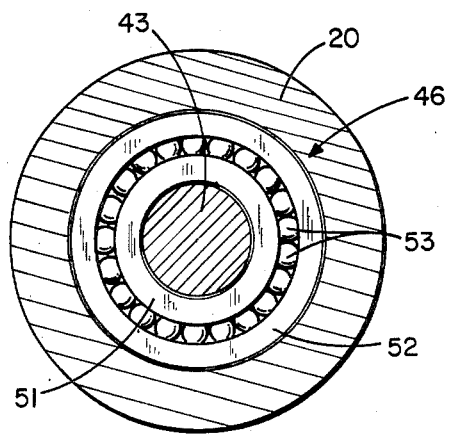
FIG. 3 is an enlarged sectional view of a portion of the swivel connector of FIG. 2 taken along the line 3—3 thereof.

Referring to the drawing, there is shown in FIGS. 1 and 2 a swivel connector according to the invention indicated generally at 10 connecting a wire rope 11 having an end loop 12 to a cable 14 equipped with an end cable connector 15 having a pull eye 16 so that the cable can be pulled into proper position by the wire rope 11. Connector 15 is the type having a sheath covering the end of the cable and secured by a plurality of annular crimps. Swivel connector 10 includes a first swivel head 18 and a second swivel head 19, an intermediate tubular body portion 20 and a load limited connecting pin or fracture pin 22. The first and second swivel heads 18, 19 are longitudinally aligned and spaced apart by the intermediate body portion 20. First swivel head 18 includes a clevis end formed by bifurcated arms 23, 24 making a loop closed by a clevis pin 25 passing through mutually aligned holes in the arms 23, 24 with an end threaded into one of them. Removal of the clevis pin 25 permits insertion and removal of loop 12 of load line 11 preparatory to and following the working operation of swivel connector 10. In like fashion, second swivel head 19 has a clevis formed by bifurcated arms 27, 28 forming a holding loop that is closed by a second clevis pin 29 passing through mutually aligned holes in the arms and having an end threaded into one of them.

Intermediate body portion 20 is a tubular member having an outside diameter corresponding to that of the first and second swivel heads 18, 19 so as to form a continuous surface when joined together. Intermediate body portion 20 has a central interior passage with a first interiorly threaded end 30. An interior annular ledge or shoulder 32 is spaced slightly inward from the opposite or second end. The shoulder 32 has a forward step 33 of slightly larger diameter than shoulder 32.

First swivel head 18 has an inner end or neck 34 that is reduced in diameter and exteriorly threaded to mate with the open end 30 of the intermediate body portion 20 for connection as shown in FIG. 2. End 34 also has a central opening 36 which accommodates the head 37 of fracture pin 22.

Figure 5:
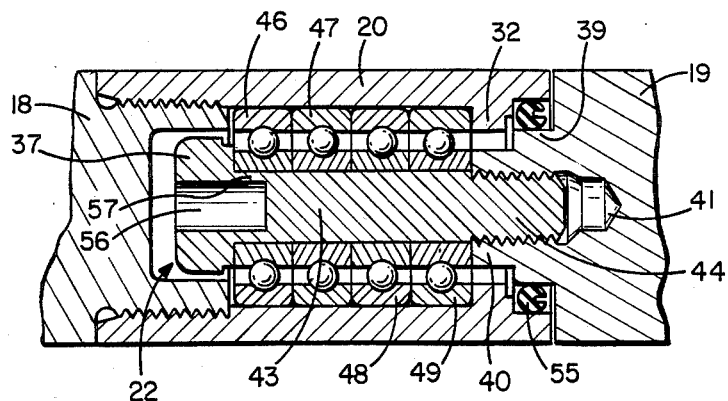
FIG. 5 is a view taken in section of an intermediate portion of the swivel connector of FIG. 2.

As shown in FIG. 5, the inward end of second swivel head 19 opposite clevis arms 27, 28 has a first reduced diameter neck 39 and a further reduced diameter second neck 40. A threaded axial bore 41 extends inwardly from the outer face of the neck 40. Pin 22 has a shack 43 extended from the pin head 37 and terminating in a threaded end 44 which is threadably engaged in the axial bore 41 of the second swivel head 19. A plurality of aligned roller bearings 46-49 surround the shank 43 of pin 22 to rotatably connect the first and second swivel heads 18, 19.

Figure 4:
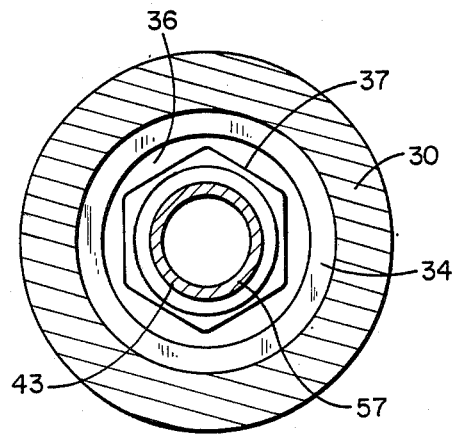
FIG. 4 is an enlarged sectional view of a portion of the swivel connector of FIG. 2 taken along the line 4—4 thereof.

As shown in FIGS. 3 to 5 and referring to exemplary bearing 46, each bearing has an inner race or ring 51 and an outer race or ring 52 with a plurality of bearing balls 53 located between them. The inner rings of the bearings are captive between the head 37 of pin 22 and the neck 40 of second swivel head 19 by virtue of the end 44 of shank 43 being threaded into the bore 41 whereby the pin 22 and second swivel head 19 rotate with the inner rings of the bearings 46-49. The outer ring of the rightmost bearing 49 bears against the inner surface of shoulder 32 of intermediate body portion 20. The outer rings of the bearings 46-49 rotate the intermediate body portion 20 and the first swivel head 18 with respect to the second swivel head 19. A rubber seal or O-ring 55 is located in the annular cavity defined between the outer surface of the shoulder 32 of body portion 20, and the face of swivel head 19 adjacent the swivel head shoulder 39. O-ring 55 can be lubricated to facilitate rotation between the opposed members. It is apparent that loading between the first and second swivel head 18, 19 is borne by the load pin 22 in tension and the bearings 46–49 in compression which imparts rotatability between the two swivel heads.

By design, shank 43 of bolt 22 will break into two pieces thereby separating the first and second swivel heads 18 and 19 when the loading between them reaches an approximate predetermined value, for example, approximately 600 pounds. Beyond this loading, an optic fiber cable in tow can be damaged. As shown in FIG. 5, an axial bore 56 extends through the head 37 of bolt 22 into the shank 43. This leaves a thin-walled section 57 of the shank 43. This section is able to withstand less tensile loading than the remainder of the shank 43. The amount of tensile loading that can be withstood at the section 57 is a function of the thickness of the wall section 57 and the modular or tensile strength of the material of the bolt 22 and can be readily calculated and experimentally verified by conventional means. Load 22 can preferably be formed of a material having a low modulus of elasticity whereby fracture occurs abruptly upon reaching the load limit. Upon fracture of the thin-walled section 57, the remainder of shank 43 is separated along with the second swivel head 19 from the first swivel head 18 and the intermediate body portion 20. Load pin 22 is thereby destroyed but easily replaced to reassemble a swivel connector.

In use of swivel connector 10, a wire rope 11 is connected to the first swivel head 18, and a cable such as a fiber optic cable 14 having a cable connector 15 with an eye 16 is connected to the second swivel head 19. This is accomplished by removal and then replacement of the clevis pins 25, 29 respectively. The wire rope 11 is used to tow the cable 14 to the appropriate placement position. Fracture section 57 of the fracture pin 22 is calibrated to fracture upon a load exceeding that of a predetermined limit to avoid injury to the cable 14. Should the load exceed the predetermined limit, fracture of the shank 43 of pin 22 occurs at load-limited section 57 by virture of the reduced cross-sectional area as compared to that of the remainder of the shank. Swivel connector 10 is usable in other applications where a swivel connection between two load members is required and where it is desirable to provide an upper limit on the permissible loading between the load members.

Figure 8:
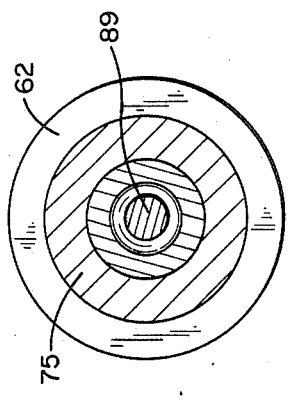
FIG. 8 is a sectional view of the portion of the swivel connector of FIG. 7 taken along the line 8—8 thereof.
Figure 6:
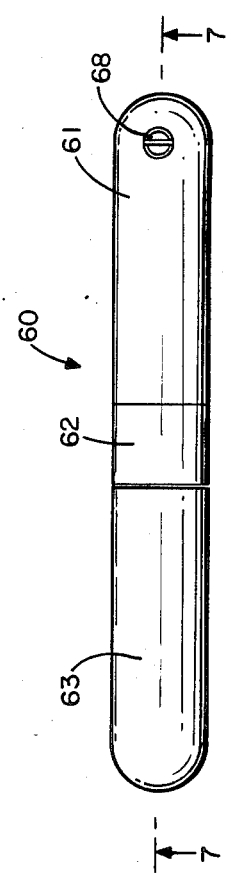
FIG. 6 is an elevational view of a swivel connector according to another form of the invention.
Figure 7:
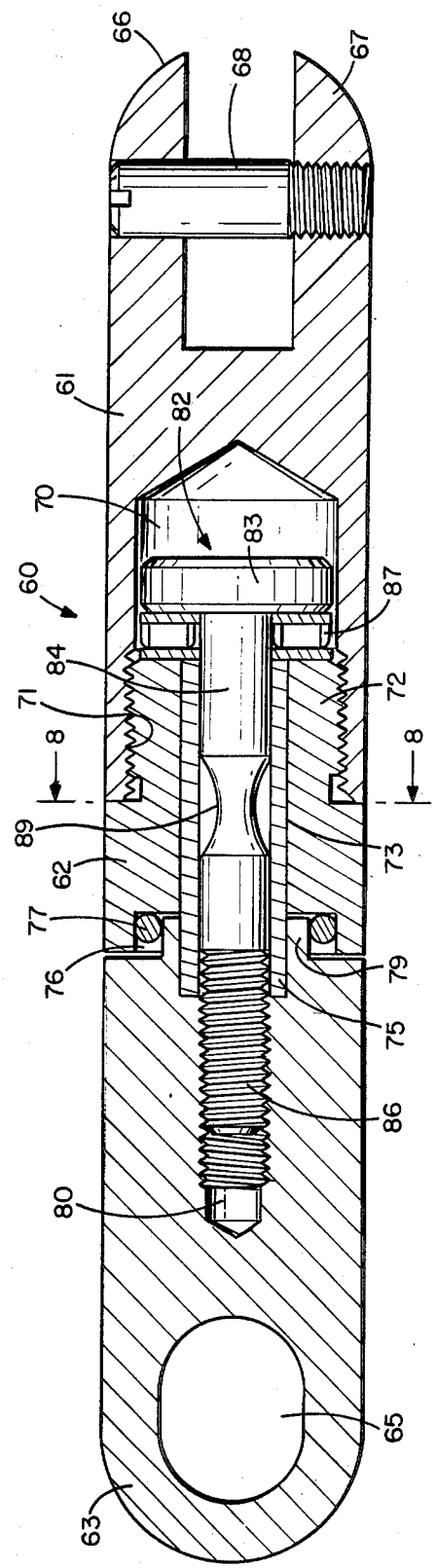
FIG. 7 is an enlarged sectional view of the swivel connector of FIG. 6 taken along the line 7—7 thereof.

Another form of swivel connector according to the invention is shown in FIGS. 6–8 indicated generally at 60. Swivel connector 60 includes a first swivel head 61 connected to an intermediate body portion 62, and a second swivel head 63 rotatably assembled with respect to the first swivel head 61 and the intermediate body portion 62. The outward end of second swivel head 63 has an integral closed loop or eye 65 for connection to a load line. First swivel head 61 has parallel clevis arms 66, 67 forming an open loop closed by a clevis pin 68 passing through mutually aligned holes in the clevis arms 66, 67 with an end threaded into one of them.

The inner end of first swivel head 61 has an enlarged axial opening 70 with an interiorly threaded end 71. Intermediate body portion 62 has a reduced diameter neck 72 that is exteriorly threaded and engages the interiorly threaded end 71 of opening 70 of first swivel head 61. Body portion 62 also has a reduced axial opening 73 extended from end to end and accommodating a sleeve 75. The opposite end of body portion 62 has an annular recess 76 which accommodates an O-ring seal 77.

The inner end of second swivel head 73 has a reduced diameter neck 79 that fits in the annular recess 76 of intermediate body portion 62 and is diametrically spaced from it a sufficient distance to accommodate the seal 77. Second swivel head 63 has a threaded axial bore 80 with an enlarged end portion proximate the shoulder 79 to accommodate an extended part of the sleeve 75. A calibrated breakaway pin 82 has a head 83 connected to a shank 84 which has a threaded end 86 threaded into the axial bore 80 of second swivel head 63.

Head 83 of breakaway pin 82 is located in the interior portion of the axial opening 70 of the first swivel head 61. Head 83 bears against a thrust bearing 87 located in the opening 70. The opposite side of thrust bearing 87 bears against the outer end of the neck 72 of intermediate body portion 62 whereby the head 83 of breakaway pin 82 is captive by intermediate body portion 62 and first swivel head 61 and is rotatable with respect thereto. Shank 84 extends through bearing sleeve 75 in axial opening 73 of intermediate body portion 62 and is connected to the second swivel head 63 by threaded end 86. It is apparent that the second swivel head 63 and breakaway pin 82 are rotatable with respect to the intermediate body portion 62 and first swivel head 61 and any load line connected thereto.

Shank 84 has a section of gradually reduced diameter section 89 calibrated for fracture when the tensile loading along shank 84 exceeds an approximate predetermined upper load limit. First and second swivel heads 61, 63 are essentially connected by the reduced diameter section 89 to limit the amount of loading permissible between the swivel heads before fracture will occur. Swivel connector 60 functions in the same manner as described with respect to the swivel connector 10 of FIGS. 1 and 2.

While there has been shown and described swivel connectors according to various embodiments of the invention, it is apparent that changes and deviations can be had therefrom without departing from the scope and spirit of the invention.

The embodiments of the invention in which an exclusive property or privilege is claimed are defined as follows:

1. A swivel connector load limited to an approximate calibrated tension load value, comprising:
   a first swivel head connectable to a load line;
   a second swivel head connectable to another load line;
   a breakaway pin having a pin shank, said shank having an external cylindrical surface, a cylindrical body, a threaded end joined to one end of said body, and an annular wall joined to the other end of said body, said body having a tensile strength greater than said calibrated tension load value, a pin head connected to said annular wall remote from said body thereby connecting said shank to said pin head, said pin head having an annular face extended laterally in an outward direction from said external surface of said shank, said pin having an axial bore extended through said pin had into said shank, said annular wall surrounding said bore adjacent said annular face and defined by the diameters of said bore and said external cylindrical surface of said shank, said annular wall having uniform thickness throughout the length thereof and a tensile strength less than said tensile strength of said body of said shank, said thickness of said annular wall having a dimension whereby said tensile strength of said annular wall along the length thereof is generally the same as the approximate calibrated tension load value whereby fracture of said shank at said annular wall will occur upon tension loading between said first and second swivel heads attaining said approximate calibrated tension load value, said second swivel head having a neck, a first shoulder surrounding said neck and an axial threaded bore extended into said neck, said neck having an end, said threaded end of said shank being threaded into said threaded bore, an intermediate tubular body portion having a first end and a second end, said tubular body portion being connected to said first swivel head and surrounding said pin, said first swivel head closing said first end of said tubular body portion, said intermediate tubular body portion having an inwardly directed annular second shoulder located at said second end thereof adjacent said first shoulder, annular seal means located between said first and second shoulders to close said second end of said tubular body, bearing means located between said shank and said intermediate tubular body portion, said bearing means having inner race means retained in engagement with said annular face of said head and said end of the neck of said second swivel head with said pin, an outer race located in engagement with said annular second shoulder, and rotatable means located between said inner and outer races whereby said first and second swivel heads are rotatable relative to each other about the longitudinal axis of said pin.

2. The swivel connector of claim 1 wherein: said first swivel head has a threaded neck; and intermediate tubular body portion having a central passage with a threaded first end connected to said neck of the first swivel head.

3. The swivel connector of claim 1 wherein: said rotatable means comprise a plurality of balls located between said inner race and outer race.

4. The swivel connector of claim 1 wherein: said annular seal means comprising a single ring seal engageable with said first and second shoulders.

5. A swivel connector load limited to an approximate calibrated tension load value, comprising:
a first swivel head having a first end and a second end, said second end being connectable to a first line;
a second swivel head connectable to a second line;
a tubular body portion connected to said first end of said first swivel head, said tubular body portion having a central passage and a first end portion connected to said first end of said first swivel head and a second end portion remote from said first end portion thereof,
a breakaway pin having a first pin end, a second pin end, a shank having an outside surface between said first and second pin ends located within said central passage of said tubular body portion and an enlaged pin head secured to said first pin end, said pin having an axial bore extended through said pin head into said shank, said shank having a thin annular wall adjacent said pin head defined by the diameters of said bore and said outside surface of said shank, said annular wall having uniform thickness throughout the length thereof, said thickness being of a dimension to give said annular wall a tensile strength about the same as said approximate calibrated tension load value whereby fracture of said annular wall will occur upon tension loading between said frist and second swivel heads attaining said approximate calibrated tension load value, and bearing means located about said shank with the central passage of the tubular body portion engageable with said second swivel head and said pin head and said second end portion of said tubular body portion, said bearing means comprising a bearing assembly disposed between said pin head and said second end portion of said tubular body portion to permit rotation between said pin and said tubular body portion, said second end of said pin being connected to said second swivel head whereby said first and second swivel heads are rotatable relative to each other about the longitudinal axis of said pin, and annular seal means located between said second end portion of the tubular body portion.

6. The swivel connector of claim 5 wherein: said second end of pin is threaded and connected to said second swivel head, said second swivel head having a threaded opening in threaded engagement with said second end of said pin.

7. The swivel connector of claim 5 including: said bearing means including a circular bearing having a central opening, said shank passing through said central opening with said pin head located on the side of said bearing means opposite said second end of the pin, said second pin end being threaded, said second swivel head having a threaded opening in engagement with said second end of said shank.

8. The swivel connector of claim 5 wherein: said first swivel head has a threaded neck; said tubular body portion having a central passage with a threaded first end connected to said neck of said first swivel head, and an inner annular shoulder extended inward of said passage; said head and shank being located in the central passage of said tubular body portion; said bearing means comprised as an annular bearing assembly having a central opening disposed between said pin head and said shoulder of said tubular body portion with said shank passing through said central opening of said bearing assembly for rotational movement between said pin and said tubular body portion while the pin is longitudinally restrained with respect to said first swivel head.

9. The swivel connector of claim 8 wherein: said annular bearing assembly is comprised as a roller bearing with an inner race and an outer race and bearing balls between said outer race bearing against said annular shoulder of said tubular body portion and said inner race bearing against said pin head.

10. The swivel connector of claim 5 wherein: said second swivel head has a threaded opening, said second end of said pin being threaded and connected to said threaded opening of said second swivel head.

11. The swivel connector of claim 5 wherein: said first swivel head has a pair of spaced apart clevis legs closed by a removable clevis pin to form an attachment loop.

12. A swivel connector load limited to an approximate calibrated tension load value comprising: a first swivel head connectable to a first line, said first swivel head having a threaded end and an interior opening at said threaded end; a second swivel head connectable to a second line, a tubular body portion connected to said first swivel head, said tubular body portion having a central passage and a first threaded end connected to said threaded end of said first swivel head and a second end remote from said first end thereof, a breakaway pin having a first end and a second end, said pin including a shank having an outer surface between said first and second ends thereof, and an enlarged pin head secured to the first end, said pin having an axial bore extended through said pin head into said shank, said shank having a thin annular wall adjacent said pin head defined by the diameter of said bore and said outside surface of said shank, said annular wall having uniform thickness throughout the length thereof, said thickness being of a dimension to give said annular wall a tensile strength about the same as said approximate calibrated tension load value whereby fracture of said annular wall will occur upon tension loading between said first and second swivel heads attaining said approximate calibrated tension load value, said shank located within said central passage of said tubular body portion, said second end of said pin being threadably connected to said second swivel head, bearing means located about said shank and engageable with said second swivel head and said pin head and said tubular body portion, said bearing means including a roller bearing assembly located within said central passage of said tubular body portion and disposed between said pin head and said second end of the tubular body portion to permit rotation between said opening in said end of the first swivel head and disposed between said pin head and said end of the tubular body portion to permit rotation between said pin and said tubular body portion, and annular seal means located between said second end of said tubular body portion and said second swivel head to enclose said bearing means within said tubular body portion 13. The swivel connector of claim 12 wherein: said tubular body portion has an inwardly directed annular shoulder at the second end thereof engageable with said bearing assembly, said annular seal means being located between said annular shoulder and said second swivel head to enclose said bearing means within said tubular body portion.

14. A swivel connector load limited to an approximate calibrated tension load value comprising: a first swivel head connectable to a first line, said first swivel head having a threaded neck, a second swivel head connectable to a second line, a tubular body portion having a central passage with a threaded first end connected to said first swivel head and an inner annular shoulder extended inward of said passage; a breakaway pin having a first end and a second end, a shank having an outer surface between said first and second ends, and an enlarged pin head secured to said first end, said pin having an axial bore extended through said pin head into said shank, said shank having a thin annular wall adjacent said pin head defined by the diameters of said bore and said outside surface of said shank, said annular wall having uniform thickness throughout the length thereof, said thickness being of a dimension to give said annular wall a tensile strength about the same as said approximate calibrated tensile load value whereby fracture of said annular wall will occur upon tension loading between said first and second swivel heads attaining said approximate calibrated tension load value, said pin being located within said central passage of said tubular body portion, bearing means comprising an annular bearing assembly located about said shank engageable with said second swivel head and said pin head and said annular shoulder of said tubular body portion, said bearing assembly is comprised of a plurality of annular roller bearings with central openings and each having an outer race and an inner race with bearing balls located between them and said pin shank passing through said central openings of said bearings, said pin head bearing against said inner race of one of said bearing assemblies, said annular shoulder of said tubular body portion bearing against said outer race of another of said bearing assemblies, annular seal means located between said annular shoulder and said second sivel head to enclose the roller bearings within said tubular body portion, and said second end of said pin being connected to said second swivel head whereby said pin is longitudinally restrained and said first and second swivel heads are rotatable relative to each other about the longitudinal axis of said pin.

15. The swivel connector claim 14 wherein: said second end of the pin is threaded and connected to said second swivel head, said second swivel head having a threaded opening in threaded engagement with said second threaded end of said pin.

16. The swivel connector of claim 14 wherein: said first swivel head has a pair of spaced apart clevis legs closed by a removable clevis pin to form an attachment loop.

* * * * *

UNITED STATES PATENT AND TRADEMARK OFFICE
CERTIFICATE OF CORRECTION

PATENT NO. : 4,687,365
DATED : August 18, 1987
INVENTOR(S) : Jon Promersberger

It is certified that error appears in the above-identified patent and that said Letters Patent is hereby corrected as shown below:

Column 1, line 39, "predetrmined" should be --predetermined--.

Column 4, line 66, "had" should be --head--.

Column 5, line 66 "enlaged" should be --enlarged--.

Column 6, line 9, "frist" should be --first--.

Signed and Sealed this

Twenty-sixth Day of April, 1988

Attest:

DONALD J. QUIGG

Attesting Officer

Commissioner of Patents and Trademarks